(12) United States Patent
Gao et al.

(10) Patent No.: US 7,984,746 B2
(45) Date of Patent: Jul. 26, 2011

(54) COVER DEPLOYING SYSTEM UTILIZING ACTIVE MATERIAL ACTUATION

(75) Inventors: Xiujie Gao, Troy, MI (US); Nilesh D. Mankame, Ann Arbor, MI (US); Alan L. Browne, Grosse Pointe, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 102 days.

(21) Appl. No.: 12/115,700

(22) Filed: May 6, 2008

(65) Prior Publication Data
US 2009/0277595 A1  Nov. 12, 2009

(51) Int. Cl.
*B60J 1/20* (2006.01)
*B60J 3/00* (2006.01)
*B60J 11/00* (2006.01)
(52) U.S. Cl. .................................. 160/370.21
(58) Field of Classification Search .................. 160/1, 5, 160/6, 7, 22, 265, 370.22, 370.23, 45, 71, 160/78, 80; 248/276.1, 279.1, 280.11, 281.11, 248/284.1, 285.1, 286.1; 74/99 R, 102, 107, 74/108
See application file for complete search history.

(56) References Cited

U.S. PATENT DOCUMENTS

| 4,909,563 | A | 3/1990 | Smith |
| 6,216,762 | B1 * | 4/2001 | Lin ........................ 160/370.22 |
| 7,180,665 | B2 | 2/2007 | Daniel et al. |
| 7,311,112 | B2 | 12/2007 | Pacheco |
| 7,455,345 | B1 * | 11/2008 | Kim ........................ 296/97.4 |
| 2006/0065375 | A1 * | 3/2006 | Chen ........................ 160/370.22 |

FOREIGN PATENT DOCUMENTS

| JP | 08167307 A | * | 6/1996 |
| JP | 2005-263188 A | | 9/2005 |

OTHER PUBLICATIONS

Cybex International, VR3 Fly/Rear Delt, available online May 16, 2006. accessed Nov. 3, 2010 at http://media.cybexintl.com/SummarySheets/12110.pdf.*

* cited by examiner

*Primary Examiner* — Blair M Johnson
*Assistant Examiner* — Jeremy C Ramsey

(57) ABSTRACT

A system for deploying and stowing a cover, including a mechanical assembly coupled to the cover, preferably comprising a plurality of deploy arms and synchronization means, and reconfigurable between deployed and stowed conditions, and further including an actuator presenting an active material element operable to undergo a change, when activated, and operable to cause the assembly to reconfigure as a result of the change.

3 Claims, 10 Drawing Sheets

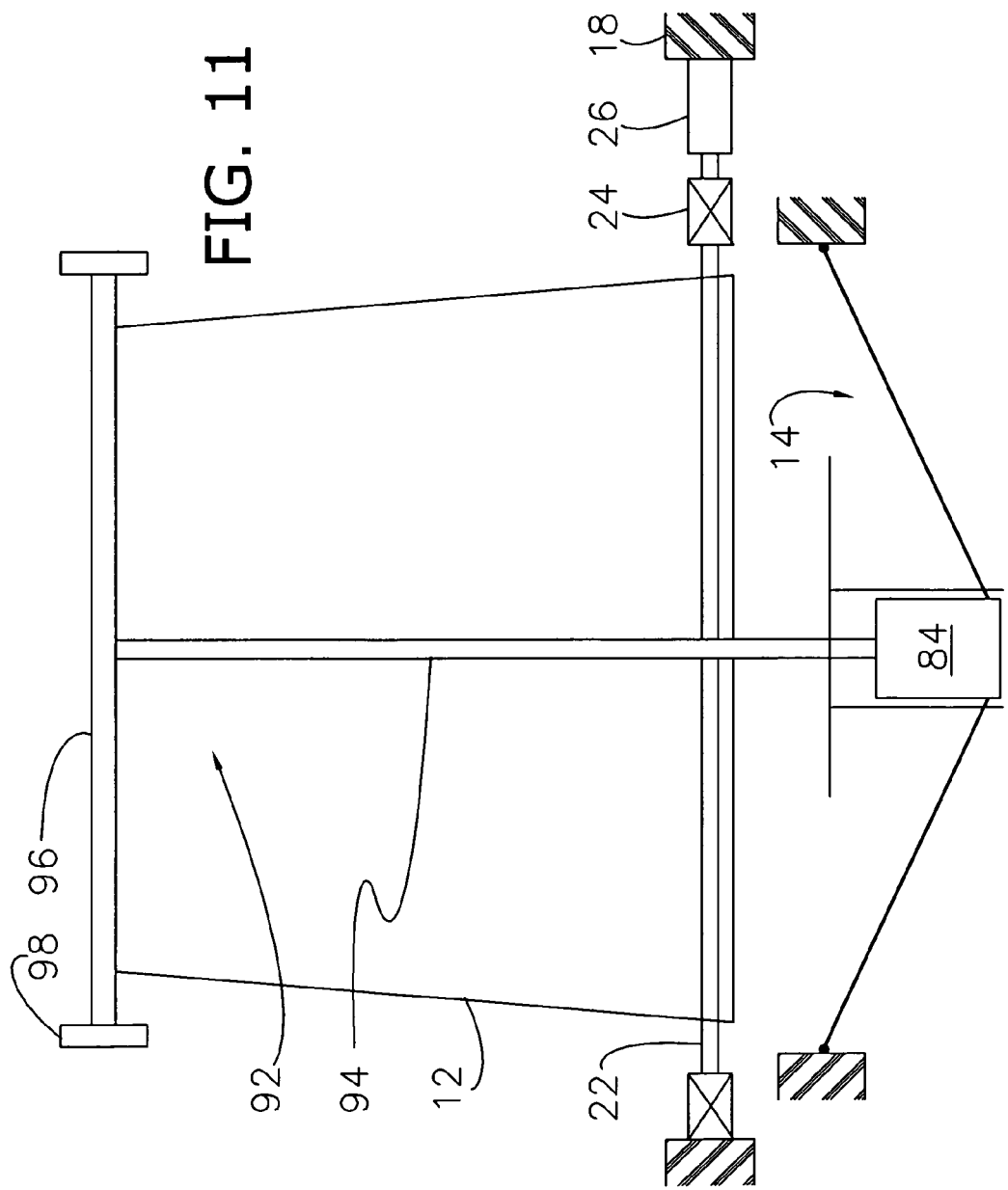

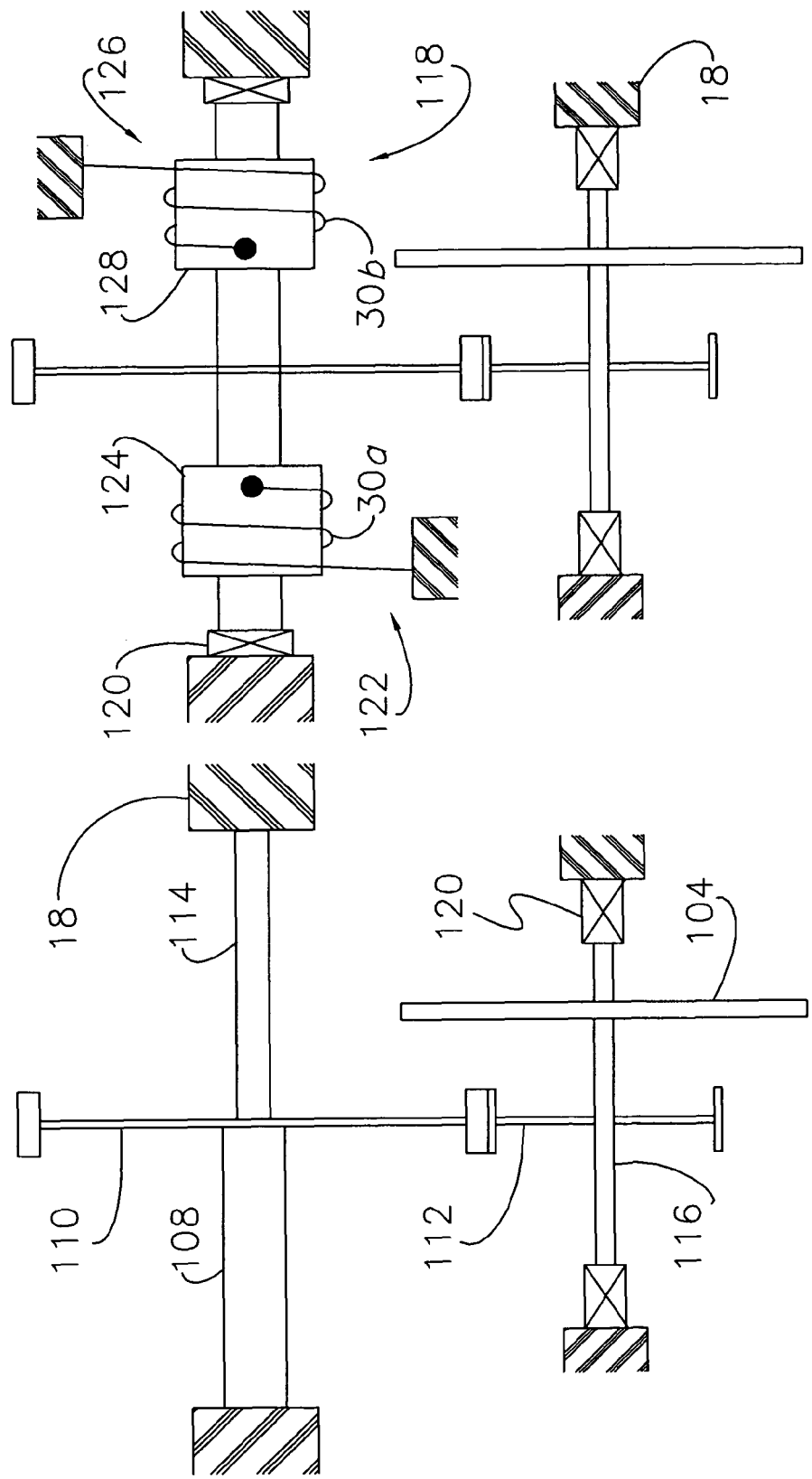

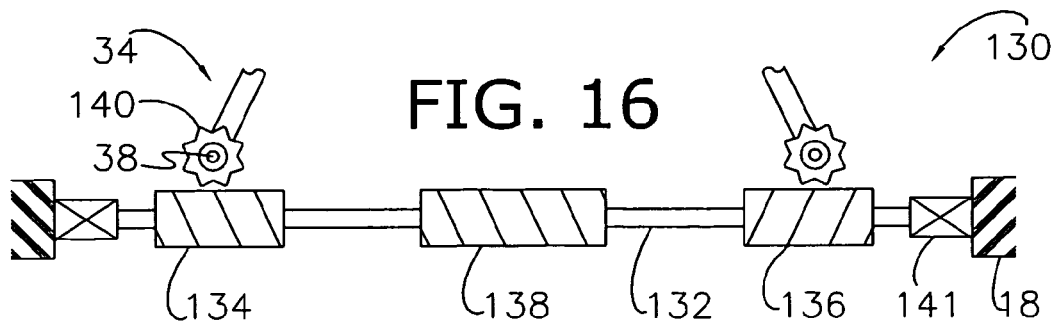
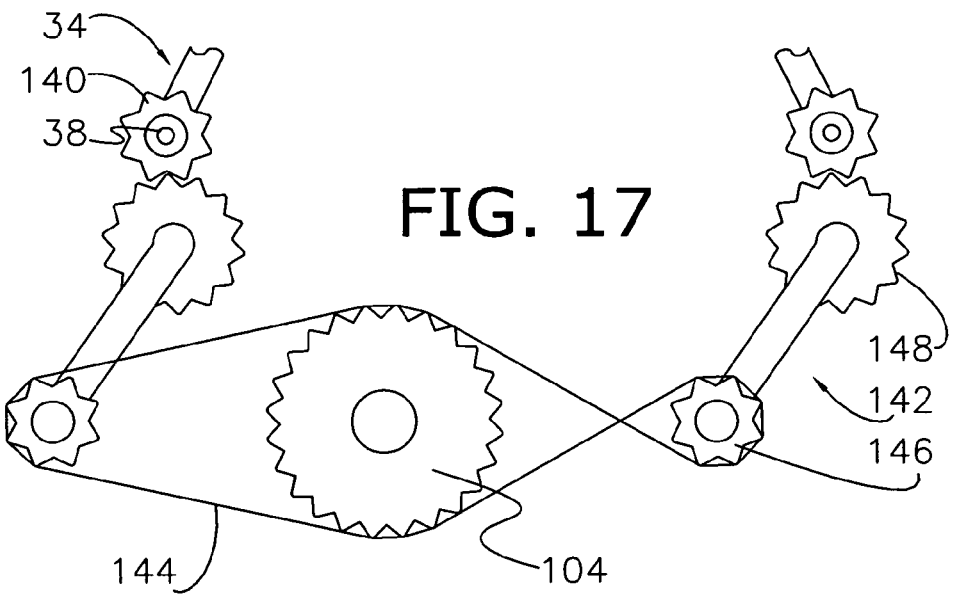
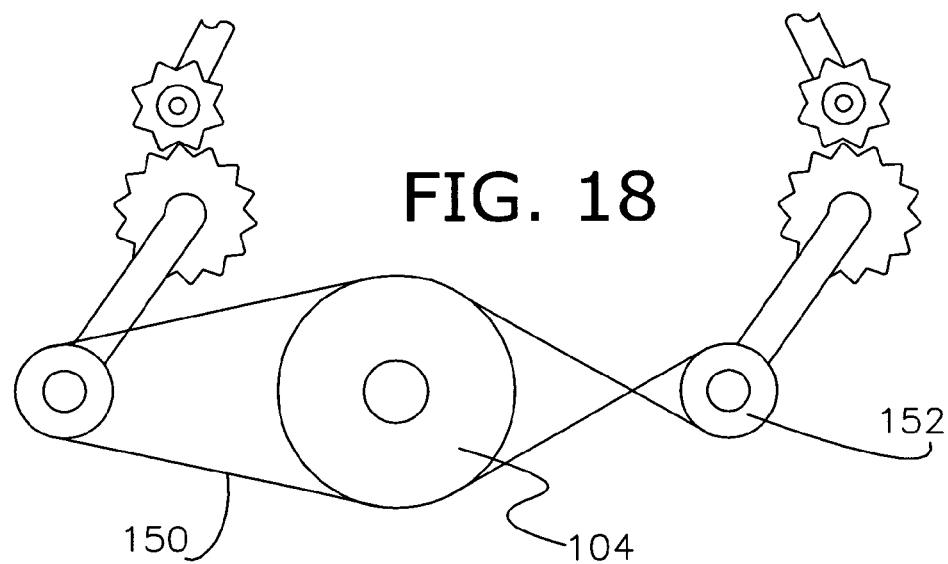

COVER DEPLOYING SYSTEM UTILIZING ACTIVE MATERIAL ACTUATION

CROSS REFERENCE TO RELATED APPLICATIONS

Reference is made to commonly assigned U.S. patent application Ser. No. 12/059,861, filed on Mar. 31, 2008, and entitled METHODS OF DEPLOYING A COVER UTILIZING ACTIVE MATERIAL AND AN EXTERNAL HEAT SOURCE; and U.S. patent application Ser. No. 11/856,744, filed on Sep. 18, 2007, and entitled ACTIVE MATERIAL ACTIVATED COVER, the disclosures of which are incorporated herein by reference.

BACKGROUND

1. Field of the Invention

The present disclosure relates to systems for deploying covers, sunshades, screens, partitions, blinds, safety cargo beams/nets and the like (collectively referred to herein as "covers"), and more particularly, to a deployment system utilizing active material actuation and a reconfigurable mechanical assembly.

2. Discussion of Prior Art

A variety of covers have long been developed to serve as barriers to heat energy and/or to direct exposure to variously the IR, UV, and visible portions of the solar spectrum. Methods of deploying these covers have likewise been developed to facilitate deployment and increase effectiveness. However, various concerns relating to conventional covers remain in the art. In automotive settings, for example, inside cover designs are typically deployed manually, thereby requiring the presence of an occupant. Where an occupant is not present, the cover cannot be deployed. As a result, excessive temperature rise (and direct exposure of interior surfaces to solar radiation) in parked vehicles due to solar energy passing through glazing often occur rapidly, resulting at least in an unpleasant situation upon vehicle entry and more rapid degradation of UV sensitive interior materials.

More recently, vehicle covers having automatic deployment mechanisms have also been developed to reduce operation time and operator contributed energy. The electro-mechanical motors involved therewith, however, present there own concerns related to increased weight, volume, cost, noise, and likelihood of failure. Moreover, these types of mechanisms further present concerns related to up-keep, repair and replacement, as well as the establishment of an additional battery load.

Similarly, outside sunshades that typically overlay an entire glazing region, such as the front or rear windshield of a vehicle, have long been utilized to block the infiltration of radiant heat energy from the sun. Concerns remain here as well, as the manual deployment and stowing of these larger shades take even more time, are inconvenient, and when not in use require significant storage space.

BRIEF SUMMARY

Plural embodiments of a system for deploying and stowing a cover that addresses the afore-described concerns are provided by the present invention. Among other things, the system is useful for providing an automatic modus for manipulating the cover that does not require the presence of an occupant/user or an electromechanical, electromagnetic, or electrohydraulic motor. More particularly, the invention utilizes the change experienced by active (or "smart") materials, when exposed to an activation signal, to effect deployment of the cover. As such, the invention is useful for providing energy conservation, which extends the battery life of the vehicle, and reduces costs. Moreover, the invention reduces equivalent component weight, and offers more robust design capabilities, packaging flexibility and accommodation than do conventional actuators.

In a preferred embodiment, the invention presents a system for deploying a cover, such as an exterior sunshade of a vehicle, utilizing active material activation that generally includes a mechanical assembly and an active-material actuator. The mechanical assembly includes a plurality of interconnected parts, and is fixedly coupled to the cover and reconfigurable between deployed and stowed conditions. The actuator includes an active material element operable to undergo a fundamental property change when activated. The actuator is drivenly coupled to the assembly and configured to impart a torque or linear translation force upon at least one of the parts so as to cause the part to rotatably or linearly translate as a result of the change. The assembly is caused to reconfigure between the deployed and stowed conditions as a result of the translation, and the cover is deployed or stowed as a result of the reconfiguration.

Thus, it is understood and appreciated that the present invention provides a number of advantages over manually and electro-mechanically/magnetically/hydraulically deployed prior art systems. Further aspects of the invention including utilizing deploy arms, sliders, at least one sliding slot, a synchronization element, shape memory alloy (SMA) wire actuation, an active-material torque tube or spooled actuator, a rack and pinion, pulley and cable, or chain and sprocket drive assembly, antagonistic elements, and more are presented herein. The above described and other features are exemplified by the following figures and detailed description.

BRIEF DESCRIPTION OF THE DRAWINGS

Preferred embodiments of the invention are described in detail below with reference to the attached drawing figures, wherein:

FIG. 1a is a front elevational view of the windshield, cover and system shown in FIG. 1, in a stowed condition, wherein the actuator is deactivated;

FIG. 11 is a front elevational view of a cover and deployment system including an active material actuator presenting a bow-tie configuration, T-frame mechanical assembly including a top frame and a center column in a fully deployed condition, and a synchronization element including a slider assembly, according to a preferred embodiment of the invention;

FIG. 11a is a side elevation view of the cover, T-frame assembly, actuator and synchronization element shown in FIG. 1, in a stowed condition;

FIG. 14 is a planar view of a drive adapted for use with the cross-link assembly shown in FIG. 12, and including an active-material actuator comprising a torque tube, in accordance with a preferred embodiment of the invention;

FIG. 15 is a planar view of a drive adapted for use with the cross-link assembly shown in FIG. 12, and including an active-material actuator comprising a spooled SMA wire, in accordance with another preferred embodiment of the invention;

FIG. 16 is an elevation view of a worm gear drive engaging first and second deploy arms having pivot gears and including right and left-hand worm gear sectors that engage the pivot gears and a main driven gear sector;

FIG. 17 is an elevation view of a mechanical assembly, including an actuator driven main sprocket gear and a plurality of drive shafts inter-driven by a chain and engaging first and second deploy arms, in accordance with a preferred embodiment of the invention;

FIG. 18 is an elevation view of a mechanical assembly, including an actuator driven main pulley and a plurality of drive shafts inter-driven by a friction belt and engaging first and second deploy arms, in accordance with another preferred embodiment of the invention;

DETAILED DESCRIPTION

Figure 1:
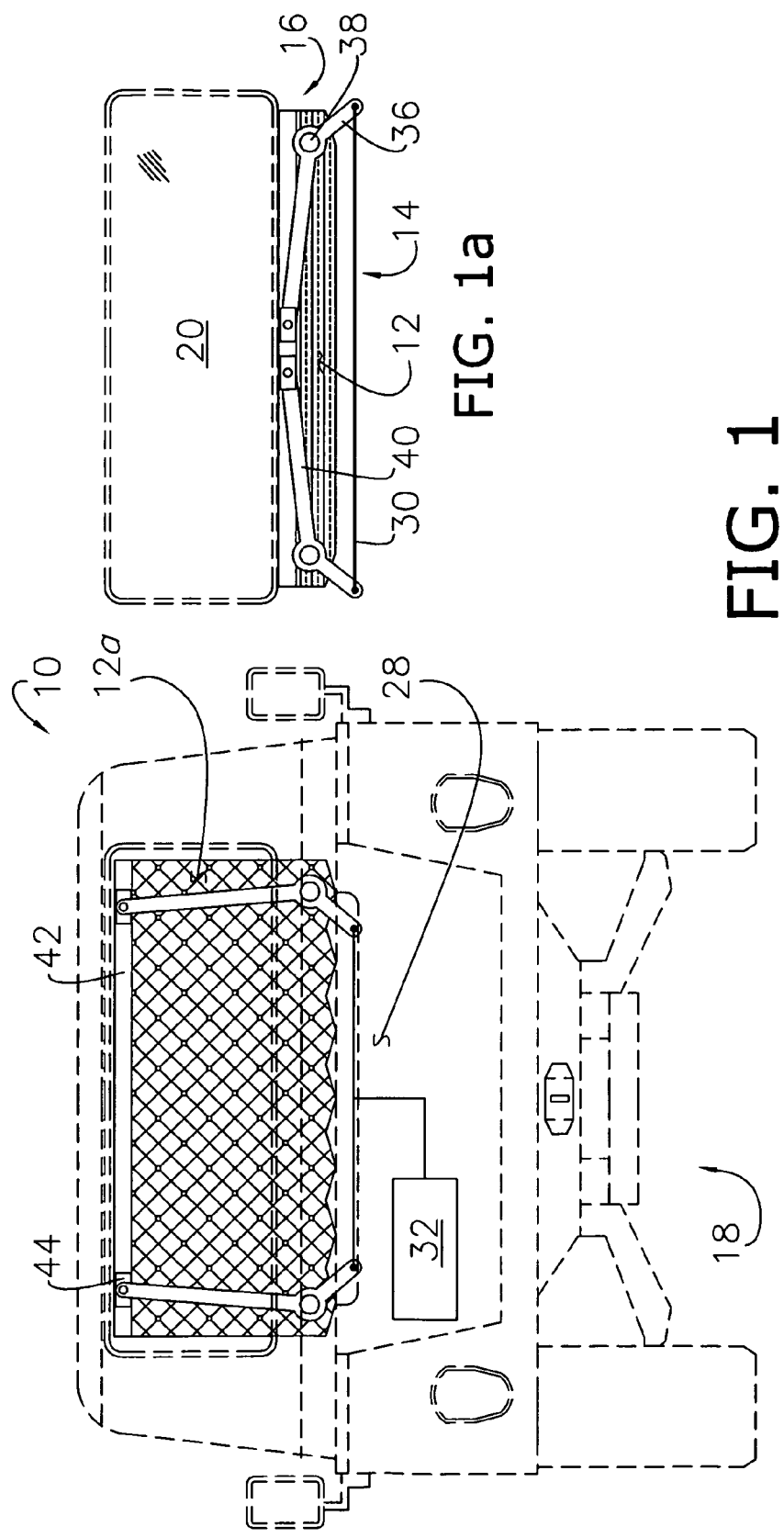
FIG. 1 is a front elevational view of a cover and deployment system including an active material actuator and mechanical assembly in a fully deployed condition, wherein the actuator includes an SMA wire and the assembly includes first and second deploy arms and a sliding slot, according to a preferred embodiment of the invention, and a vehicle including a rear windshield engaging the system.

Turning first to FIGS. 1 and 1a, the present invention concerns a system 10 adapted for deploying and stowing a cover 12, and including an active-material based actuator 14 and a reconfigurable mechanical assembly 16 driven by the actuator 14. Although described herein with respect to a vehicle 18, such as an automobile, it is appreciated that the benefits of the present invention can be utilized in other settings wherein utilizing active material to deploy a cover more efficiently and reliably is desired. For example, the inventive system 10 may be utilized in conjunction with residential or commercial buildings; or to selectively deploy a cargo net or safety beam, so as to protect a three-dimensional space or catch loose objects. As such, the term "cover" is not limited to the embodiments illustrated herein, and shall include, for example, sunscreens, sun sheets, sunshades, interfering window slats (also know as "blinds"), cargo bed covers, storage well/bin covers, partitions (e.g., screening, security, protective, and privacy), barriers (e.g., sound, thermal, light, fluid (e.g., moisture, gas, liquid), and/or weather), support beams, and the like.

In FIG. 1, the cover 12 is disposed near and configured to overlay a glazing surface 20 (e.g., a vehicle windshield) when deployed. In this embodiment, the cover 12 is configured to block heat transfer to or direct exposure to solar rays of from the surface 20 or a portion of the compartmental space, and as such preferably presents a planar member having a reflective exterior layer 12a.

The term "stowing" as used herein shall mean retracting and storing the cover 12, once deployed. The cover 12, actuator 14, and assembly 16 are cooperatively configured so as to be stowable, in the stowed condition, within available storage space; such as for example, the interior space between the trunk hood panels, or the upper rear portion of the interior compartment of the trunk 28 of the vehicle 18, as suggested in FIG. 1a. The preferred cover 12 is pliable so as to be folded to facilitate storage (FIG. 1a). More preferably, the cover is predominately formed of flexible material (e.g., fabric), such that the cover 12 is able to be wound about a scroll or support rod 22 (FIG. 11), when the actuator 14 is deactivated. In this configuration, the scroll 22 may further present support bearings 24 spaced at the ends of the rod 22, and a torsion spring 26 for biasing the system 10 towards a stowed condition (FIG. 11).

The inventive system 10 employs the reversible shape, stiffness, and/or shear strength change capabilities of an active (or "smart") material to deploy and/or stow the cover 12, and as such, preferably utilizes a relatively large displacement active material. As used herein the term "active material" (AM) is to be given its ordinary meaning as understood and appreciated by those of ordinary skill in the art; and thus includes, but is not limited to, any material or composite that undergoes a reversible fundamental (e.g., intensive physical, chemical, etc.) property change when activated by an external stimulus or signal. The term "active-material based actuator" shall mean an actuator of the cover whose primary function is driven by a change in at least one active material.

As previously mentioned, the active-material based actuator 14 is in operable communication with the cover 12 (FIGS. 1 through 18). It is appreciated that the inventive system 10 and modes of operation disclosed herein are employable by select active-material based actuators, including those exemplary embodiments described and illustrated herein. However, it is appreciated and understood that other configurations and forms of active-material actuation may be used in combination with the inventive assembly 16, such that the invention encompasses any active-material based actuator and reconfigurable mechanical assembly combination for deploying a cover. Suitable active materials for use with the actuator 14 include, without limitation, shape memory materials, nano tubes, electroactive polymers (EAP), piezoelectric materials, magnetorheological elastomers and fluids comprising the same, and electrorheological elastomers and fluids comprising the same.

As shown in the illustrated embodiment, however, the preferred actuator 14 includes a heat responsive active material (AM) element 30, such as a shape memory alloy (SMA), shape memory ceramic (SMC), or thermoresponsive shape memory polymer (SMP) wire, wherein the term "wire" is meant to encompass a range of geometric forms such as strands, strips, bands, cables, sheets, slabs, springs, etc. FIG. 1 shows an actuator 14 consisting essentially of a single elongated SMA wire 30, of sufficient tensile strength and activation displacement, connected to moveable parts of the assembly 16, so as to directly cause deployment and stowing.

As such, the preferred element 30 is thermally coupled to an activation signal source 32, such as the Sun, which presents direct heating, or the battery (FIG. 1) of the vehicle 18, which provides indirect heating through the resistance of a medium. To activate the actuator 14, the element 30 is heated from a first and to a second temperature by the source 32. At the second temperature the element 30 is caused to undergo the change in fundamental property. For example, where the element 30 is an SMA wire, the second temperature may be the austenite finish temperature of the material, and the change results in a modification of the wire length. When the element 30 has cooled to a third temperature less than the second and undergoes a reversal of the change, the cover 12 is caused to retract by reversing the configuration of the assembly 16 to the stowed condition. Where the element 30 is an SMA wire, the third temperature may represent the martensite finish temperature.

The cover 12 may be deployed directly by the change in the element 30; or indirectly, through further actuator components (not shown) designed to release stored energy. Once deployed, the actuator 14 may be configured such that maintaining the change in the activated element 30 retains the cover 12 in either a partially or fully deployed condition. Alternatively, a locking mechanism, such as a latch or locking pin (also not shown), may be triggered to hold the cover 12 in the deployed condition, while the element 30 cools and deactivates. To enable stowing, the locking mechanism is then released.

In a preferred embodiment, the cover 12 is automatically stowed after deployment for a predetermined period or the occurrence of an event (e.g., cessation of solar loading), by the reversing action of the active material element 30. As such, the system 10 may further include one or more sensors (not shown) communicatively coupled to the actuator 14.

Turning to the plural embodiments of the inventive assembly 16, FIG. 1 shows a mechanical assembly 16 having a plurality of interconnected parts, at least a portion of which is fixedly connected to the cover 12. In function, the novel assemblies 16 disclosed herein provide efficient and reliable means for converting the change of an active material (e.g., the change in length of the SMA wire 30 when activated) into the deployment of the cover 12. At least a portion of the parts are "reconfigurable" in orientation and positioning, so as to result in selective stowed and deployed conditions.

More preferably, the assembly 16 is configured to increase the activation displacement of the wire 30 to a resultant displacement. In the illustrated embodiments, the parts generally include first and second identical deploy arms 34, the stowed condition is depicted where the arms 34 are oriented in a generally horizontal position; and the fully deployed condition results where the arms 34 are brought to a generally vertical position. The arms 34 may be integral or as further described below a composite structure.

In FIG. 1, the SMA wire 30 is diametrically attached to both arms 34 and configured to impart a linear translation force thereto, when activated and deactivated. More particularly, in this configuration, each arm 34 defines an actuator engaging short portion 36 having a first length, a grounded pivot point 38 stationary with respect to the vehicle 18, and an extender arm portion (or side column) 40 presenting a second length substantially longer than the first. The wire 30 pulls the short portions 36 toward each other; thereby causing the arms 34 to swing about the pivot points 38; and the difference in extender and engaging portion lengths results in mechanical advantage and the increased displacement at the end of the arms 34.

In this configuration, the assembly 16 further includes at least one sliding slot 42 securely coupled to the cover 12. The slot 42 may be fixedly attached to the distal edge of the cover 12 as illustrated, or removably connected thereto, for example, by a plurality of clips (not shown). The slot 42 defines a track or race, wherein first and second rectangular sliders 44 are entrained and linearly translate (FIGS. 1 and 1*a*). The deploy arms 34 are pivotally connected to the sliders 44, for example by pin and sleeve assembly known in the art. During operation, as the arms 34 swing, the sliders 44 translate and pivot relative thereto, converting the rotational displacement of the arms 34 into linear motion by the sliders 44. The sliders 44 translate between laterally outermost positions of full deployment (FIG. 1) to interior stowed positions (FIG. 1*a*).

Figure 2:
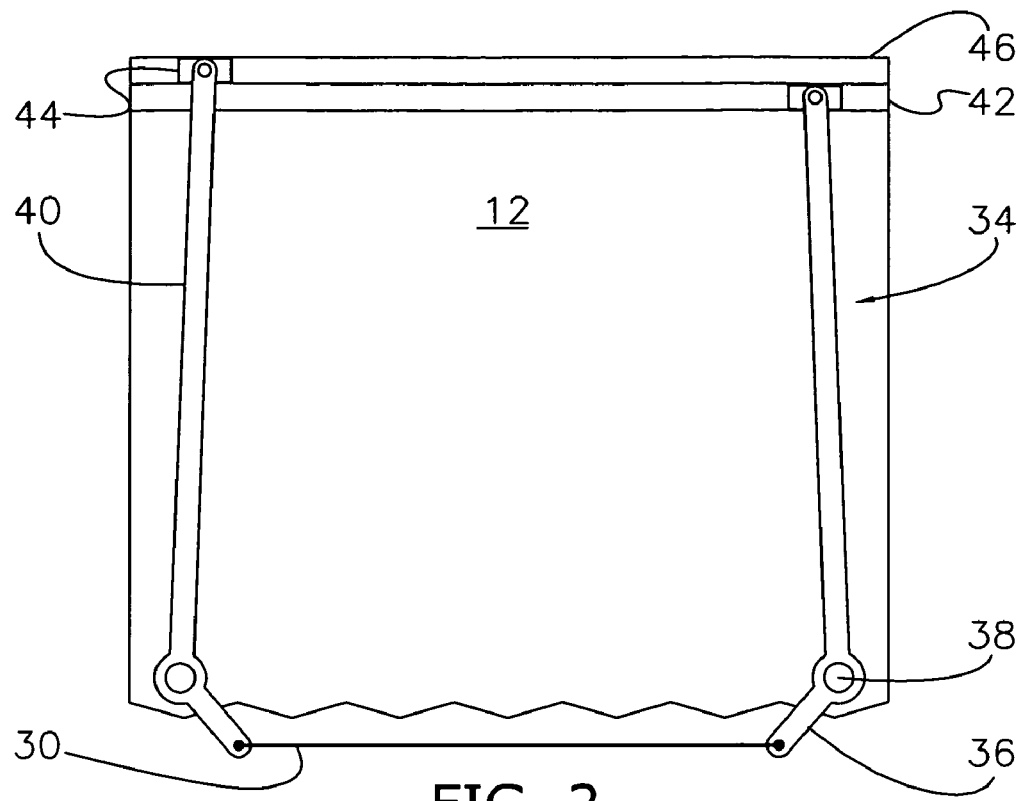
FIG. 2 is an elevational view of a cover and deployment system including an active material actuator and mechanical assembly in a fully deployed condition, wherein the assembly includes first and second sliding slots and extended deploy arms, according to a preferred embodiment of the invention.
Figure 2A:
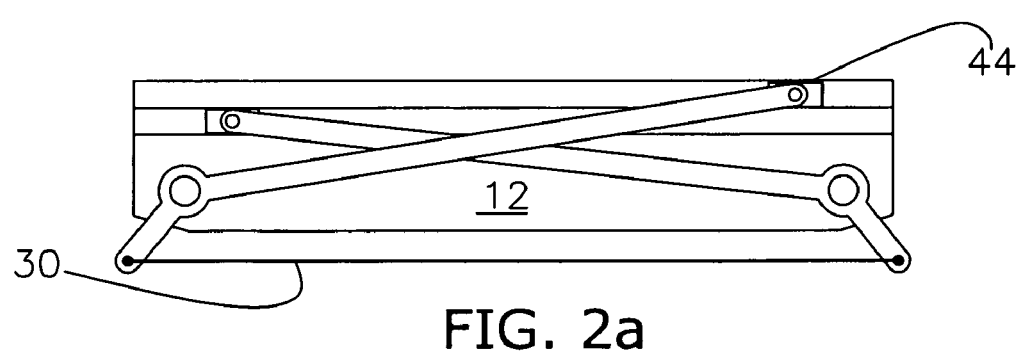
FIG. 2a is an elevational view of the cover and system shown in FIG. 2, in a stowed condition, wherein the actuator is deactivated.

Alternatively, and as shown in FIG. 2, the assembly 16 may include a second slot 46, preferably laterally adjacent and longitudinally congruent with the first 42. In this configuration, each slot 42,46 receives only one slider 44, so as to substantially increase the range of motion available to each slider 44. This results in the ability to employ longer deploy arms 34 by enabling the sliders 44 to be positioned at opposite ends of the respective slot 42 in the fully stowed and deployed conditions (compare, FIGS. 2 and 2*a*); and as such, the deployment of a longer cover 12 is enabled.

Figure 3:
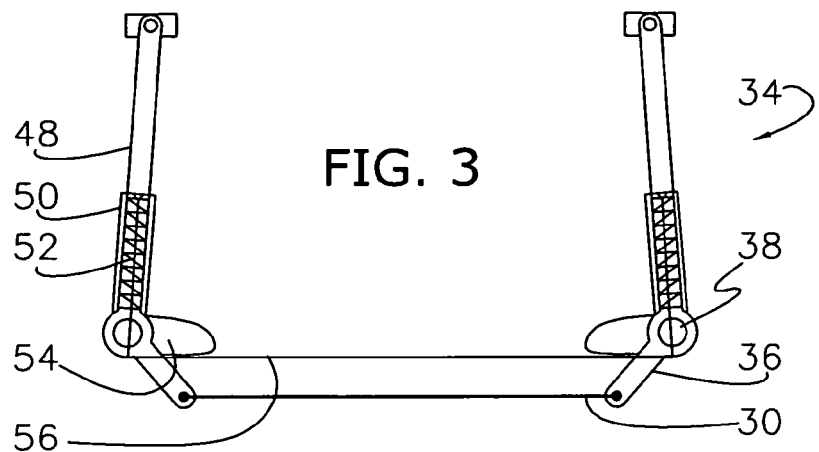
FIG. 3 is a front elevational view of a mechanical assembly adapted for use with a preferred embodiment of the present invention, shown in deployed condition, including first and second deploy arms, wherein each deploy arm defines an arm pivot point and comprises inner and outer telescopingly engaged parts and a cam rotatable about the point, and further including a cable interconnecting the retractable inner parts and engagable by the cams as the arms rotate so as to cause to retract the retractable parts.
Figure 3A:
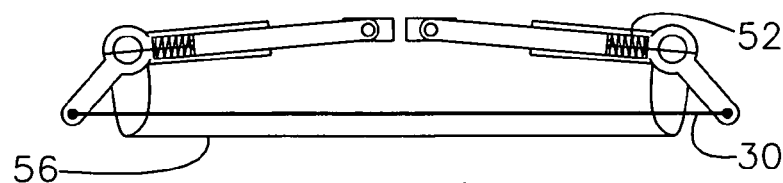
FIG. 3a is an elevational view of the cover and system shown in FIG. 3, in a stowed condition, wherein the actuator is deactivated.

In another embodiment configured to increase cover length, each deploy arm 34 further includes telescopingly engaged inner and outer arm subparts 48,50, presenting fully extended and retracted conditions (FIGS. 3 and 3*a*). The outer arm subpart 50 presents a hollow sleeve; while the inner subpart 48 is cross-sectionally configured relative to the outer subpart 50, so as to be tightly received therein. The arms 34 are biased towards the fully extended condition, for example, by a spring 52 internally housed within the outer sleeve subpart 50. To effect retraction, a cam 54 is fixedly connected to the arms 34, such that the cams 54 are caused to rotate about the arm pivot points 38 in a downward direction as the arms 34 pivot towards the stowed condition. A cable 56 interconnects the inner subparts 48, passes through the interior space defined by the outer subparts 50, and engages the cams 54 as they rotate. The cams 54 increase the travel path of the fixed length cable 56 thereby causing the inner subparts 48 to retract and the spring 52 to compress (FIG. 3*a*), as the arms 34 pivot. This results in a shortening of the deploy arms 34 in the stowed condition, for example, to the length shown in FIG. 1*a*.

Figure 4:
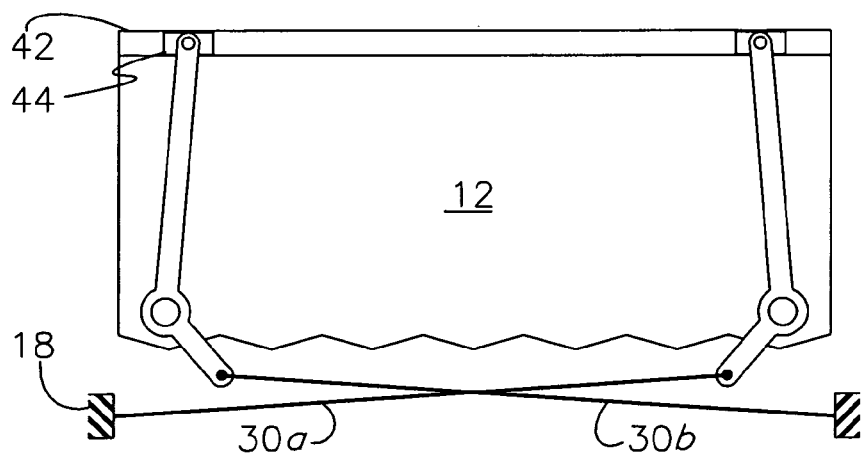
FIG. 4 is a front elevational view of a cover and deployment system including an active material actuator and mechanical assembly in a fully deployed condition, wherein the actuator includes first and second crossed SMA wires individually attached to a respective deploy arm, according to a preferred embodiment of the invention.
Figure 4A:
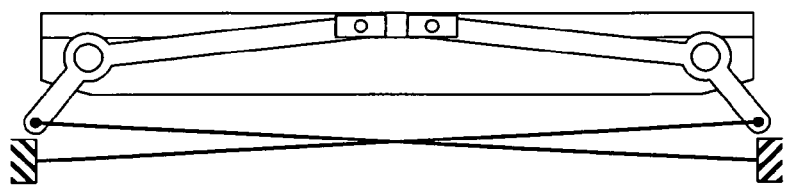
FIG. 4a is a front elevational view of the cover and system shown in FIG. 4, in a stowed condition, wherein the actuator is deactivated.

As shown in FIGS. 4 and 4*a*, first and second SMA wires 30*a,b* can be individually connected to a respective one of the deploy arm engaging portions 36 and to a fixed point of the vehicle 18. Here, the wires 30*a,b* are affixed to the vehicle 18 on opposite sides of the longitudinal centerline of the assembly 16, so as to impart opposite engagement forces upon the arms 34 (and towards the centerline) when activated, and as such present a crossed configuration. It is appreciated that utilizing a separate wire for each deploy arm 34 substantially increases the operable length of the active material.

Figure 5:
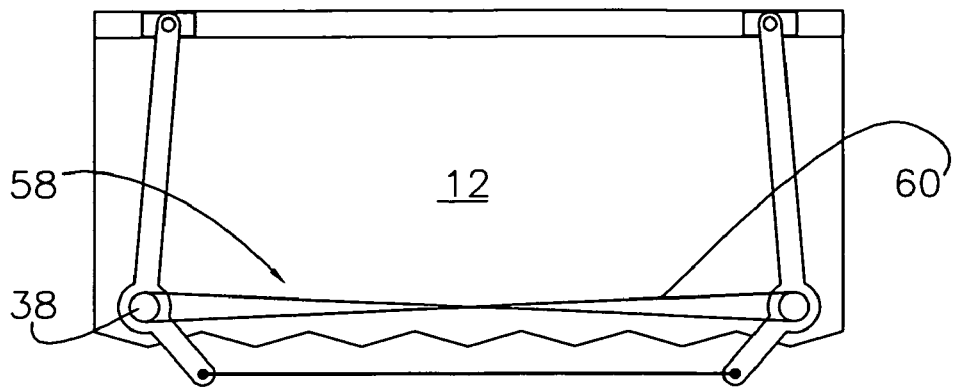
FIG. 5 is a front elevational view of a cover and deployment system including an active material actuator, a mechanical assembly including first and second deploy arms defining arm pivot points, and a synchronization element including a crossed cable engaging the pivot points of the arms in a deployed condition, according to a preferred embodiment of the invention.

In another aspect of the invention, the system 10 preferably includes a synchronization element 58 coupled to the assembly 16 and operable to ensure that the arms 34 equally pivot as a result of activating the element 30. For example, as shown in FIG. 5, where the arms 34 present engaging surfaces circumscribing the pivot points 38 (e.g., a projecting prong concentrically aligned therewith), the synchronization element 58 may include a crossed belt 60 frictionally engaging the surfaces. If either arm 34 pivots, the belt 60 is caused to translate thereby causing the other arm 34 to equally pivot in the opposite direction.

Figure 6:
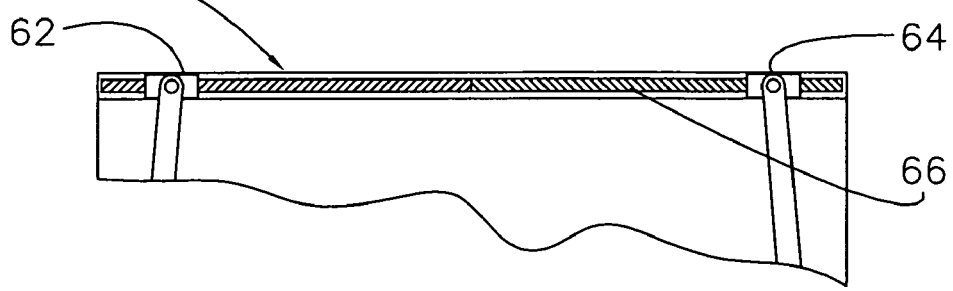
FIG. 6 is a partial elevation view of a cover and deployment system including an active material actuator, mechanical assembly including first and second deploy arms in a deployed condition, and a synchronization element including a screw rod and left and right-handed screws attached to the deploy arms, according to a preferred embodiment of the invention.

In a preferred embodiment of the invention shown in FIG. 6, synchronization is accomplished wherein a first slider 44 presents a right-handed screw 62 and the second slider 44 presents a left-handed screw 64, and a screw rod 66 matching and concentrically aligned with the screws 62, 64 is entrained within the slot 42. In this configuration, if one of the non-rotatable sliders 44 is caused to translate, the rod 66 rotates, which in turn causes the other slider 44 to translate. Thus, neither slider 44 can translate without the other.

Figure 7:
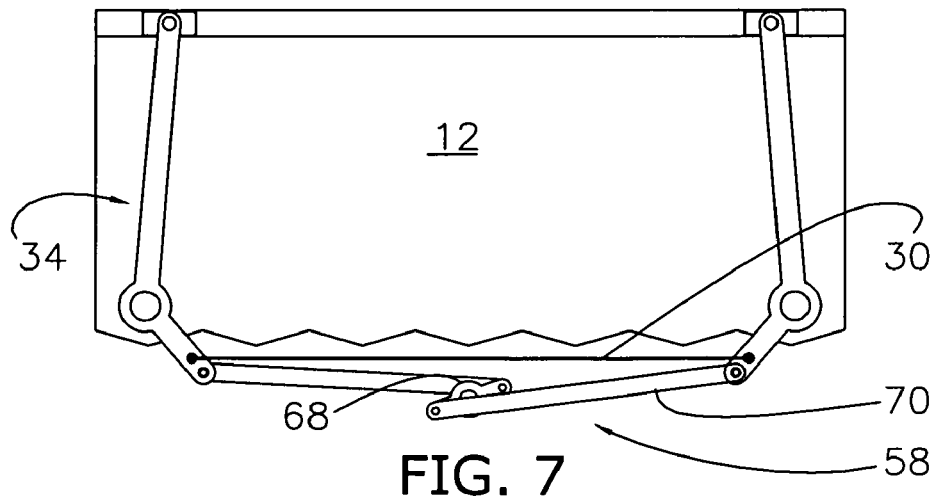
FIG. 7 is a front elevational view of a cover and deployment system including an active material actuator, mechanical assembly in a fully deployed condition, and a synchronization element including a synchronization arm and first and second levers engaging the assembly, according to a preferred embodiment of the invention.
Figure 7A:
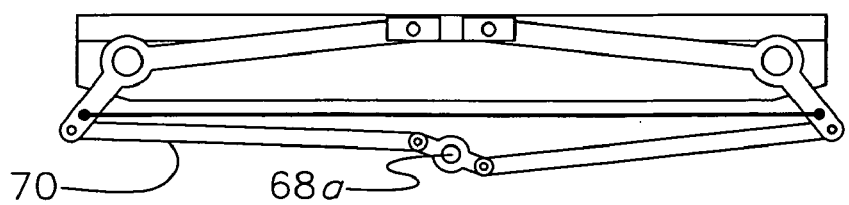
FIG. 7a is a front elevational view of the cover and system shown in FIG. 7, in a stowed condition, wherein the actuator is deactivated.

Another embodiment of the synchronization element is shown in FIGS. 7 and 7*a*, wherein an elongated member 68 having a stationary central pivot point 68*a* relative to the vehicle 12 is coupled to the actuator engaging sections 36 of the arms by hinged levers 70. The connections between the levers 70, member 68 and arms 34 further present pivot points to enable relative rotation. In this configuration, when the actuator 14 causes either arm 34 to translate, the member 68 is also caused to pivot about the central point 68*a*, which in turn causes the other arm 34 to translate equally to the first.

Figure 8:
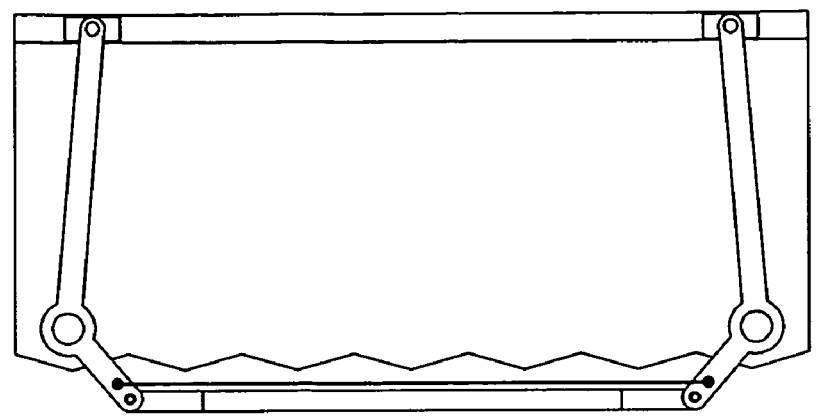
FIG. 8 is a front elevational view of a cover and deployment system including an active material actuator, a mechanical assembly including first and second deploy arms in a deployed condition, and a synchronization element including first and second racks attached to the arms and interconnected by a pinion gear, according to a preferred embodiment of the invention.
Figure 8A:
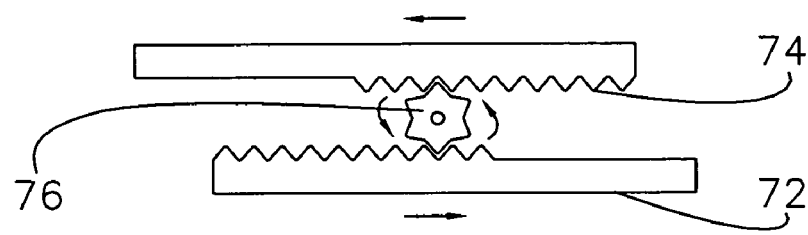
FIG. 8a is a plan view of the synchronization element shown in FIG. 8, particularly illustrating the pinion gear.

In another preferred embodiment of the invention shown in FIGS. 8 and 8*a*, the synchronization element 58 includes first and second identical racks 72 that inter-engage the arms 34, so as to congruently cause them to pivot. In a first configuration, each of the engaging arm portions 36 is fixedly attached to one of the racks 72; the racks 72 present facing teeth 74 and extend toward the centerline of the assembly 16; and finally, a free pinion gear 76 having a fixed axis is intermediately positioned and meshed with both sets of teeth 74, so as to be drivenly coupled to the racks 72. As shown in FIG. 8*a*, when one of the racks 72 is caused to translate by the actuator 14, the gear 76 rotates about its axis, which in turn causes the other rack 72 to translate congruently to the first.

Figure 9:
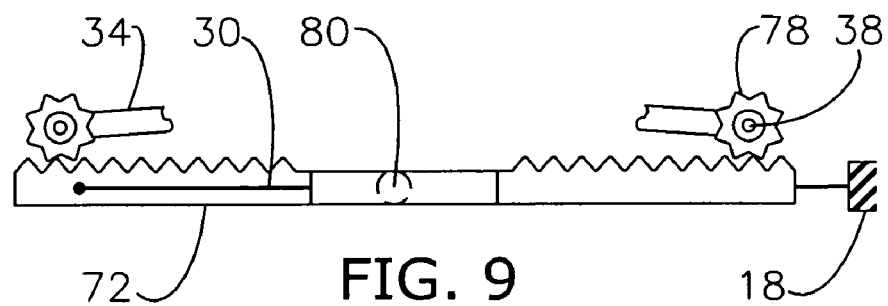
FIG. 9 is an elevational view of an actuator and a synchronization element adapted for use with a preferred embodiment of the invention, and having first and second racks interconnected by a cable and pulley system.
Figure 9A:
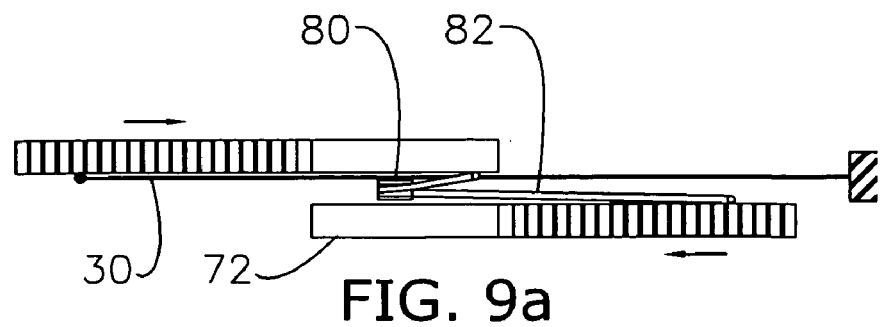
FIG. 9a is a plan view of the actuator and element shown in FIG. 9, particularly illustrating interconnection of the pulley and racks.

In a second configuration, rack orientation is reversed in order to engage gear teeth defined by each arm 34 (FIG. 9). More particularly, each rack 72 engages a distal pinion gear 78 fixedly attached to a respective arm 34 at the pivot point 38 (the engaging short portion of the arm 34 is omitted). A first rack 72 is coupled to the vehicle by an SMA wire 30 that causes the rack 72 to slidably translate, so as to correspondingly pivot the arm 34, when activated. The first rack 72 is further connected to the second rack 72, also slidably engaged with the vehicle 18, by a pulley 80 intermediately positioned between the racks and a cable 82 tautly wound about the pulley 80 (FIG. 9*a*). As a result, the second rack 72 is caused to congruently translate in the opposite direction, when the wire is activated.

Figure 10:
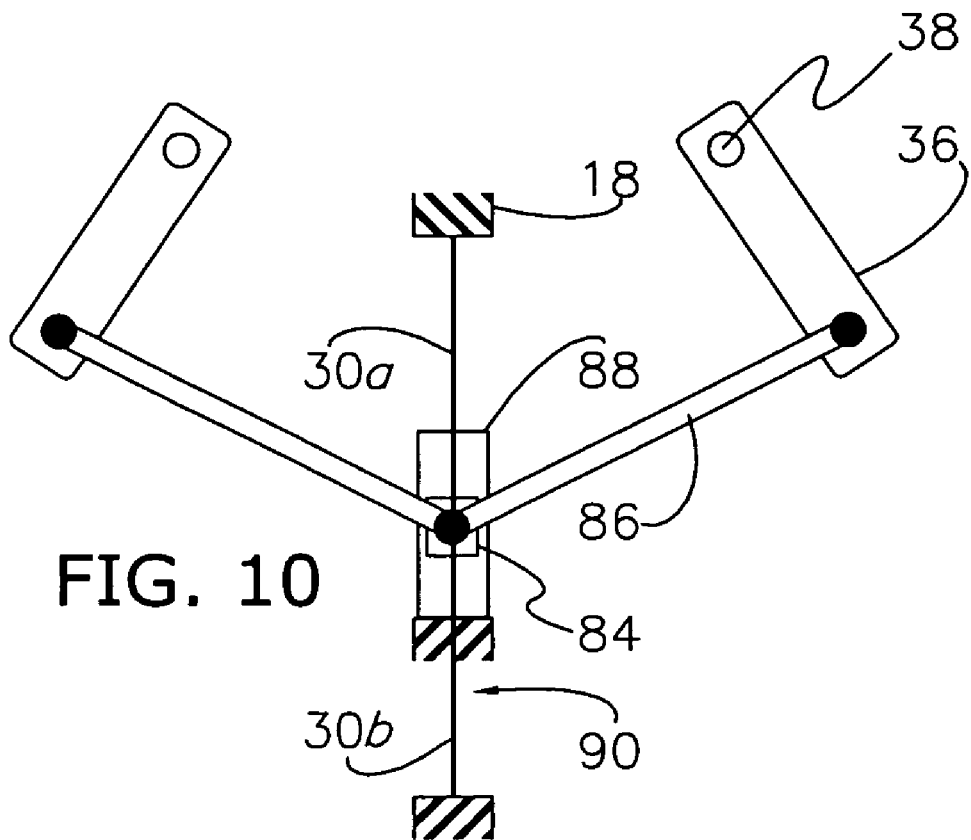
FIG. 10 is an elevational view of an actuator and synchronization element presenting a crank and slider configuration, wherein deploy arms are connected to a slider by hinged links, and antagonistic first and second SMA wires are configured to translate the slider in opposite directions, according to another preferred embodiment of the invention.
Figure 10A:
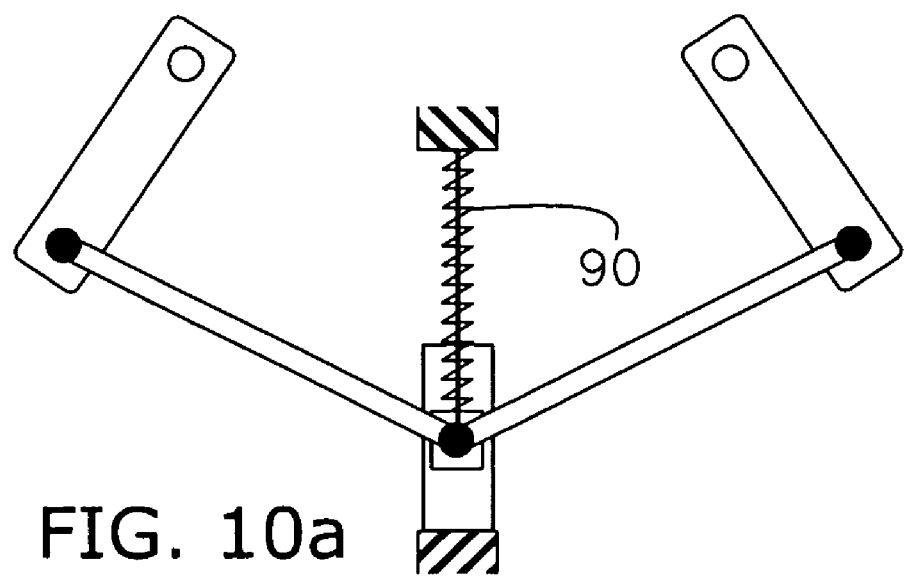
FIG. 10a is an elevational view of another embodiment of the crank and slider configuration shown in FIG. 10, wherein the antagonistic element presents a compression spring concentrically aligned with the first wire.

In a preferred embodiment shown in FIGS. 10 and 10*a*, the actuator 14 presents a crank and slider configuration, wherein a linearly translatable slider 84 is coupled to the actuator engaging sections 36 of the arms by hinged links 86. The slider 84 is engaged by a first SMA wire 30*a* operable to cause the slider 84 to translate as a result of activation. As the slider 84 translates the deploy arms 34 are caused to pivot due in part to the fixed lengths of the links 86. The slider 84 travels within a race 88 vertically oriented and more preferably located at the lateral centerline of the assembly 16. The links 86 are pivotally coupled to the slider 84 and arms 34, so as to facilitate the transfer of force therebetween.

More preferably, the actuator 14 further includes an antagonistic element 90 engaged to the slider 84 and configured to reverse the translation of the slider 84 caused by the wire 30*a*. The antagonistic element 90 causes the cover 12 to stow after deploying, and preferably presents a biasing force towards the stowed condition. The antagonistic element 90 may include a second SMA wire 30b, as shown in FIG. 10, or a conventional tension spring connected to the slider 84 opposite the first wire 30a and to a fixed point of the vehicle 18. Alternatively, a compression spring 90 concentrically aligned with the first wire 30a may be used, as shown in FIG. 10a.

In another crank and slider configuration shown in FIGS. 11 and 11a, the assembly 16 may include a T-frame structure 92 in lieu of links 86 and deploy arms 34. The structure 92 is formed by a center column 94 connected to the slider 84, and a top frame 96 orthogonally fixed to the column 94 such that the column 94 bisects the frame 96. The frame 96 is securely coupled preferably to the distal edge of the cover 12 so as to cause the cover 12 to deploy or stow as the frame 96 migrates against the windshield 20 (FIG. 11a). The column 94 is pivotally connected to the slider 84 to facilitate migration. The preferred top frame 96 further presents first and second lateral wheels 98 at its distal ends, so as to rollingly engage the windshield 20. More preferably, a biasing spring 100 engages the column 94 so as to bias the top frame 96 towards the windshield 20, and a return spring 102 is provided to bias the T-frame structure 92 towards the stowed condition (FIG. 11a).

Figure 12:
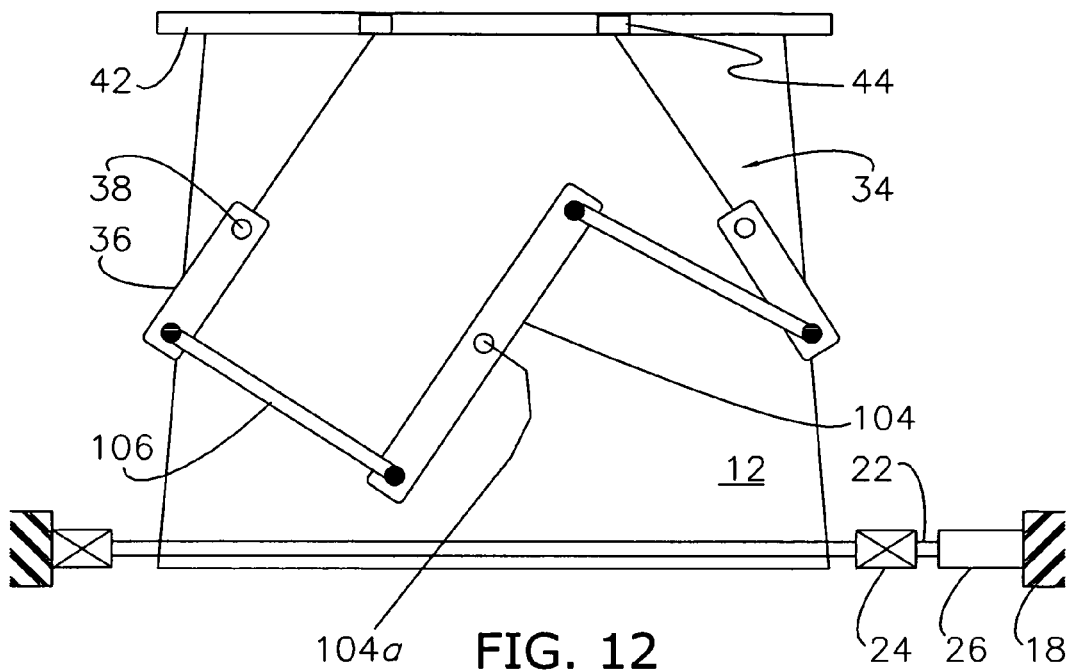
FIG. 12 is a front elevation view of a cover and cross-link drive mechanical assembly including a driven member for deploying and stowing the cover, in accordance with a preferred embodiment of the invention.

Yet another embodiment of the assembly 16 is shown in FIG. 12, wherein an elongated driven arm or member 104 having a stationary central pivot point 104a is coupled to the actuator engaging sections 36 of the arms by hinged links 106. The connections between the links 106, member 104 and arms 34 further present pivot points to enable relative rotation. The actuator 14 is configured to cause the member 104 to pivot about the central point 104a as a result of the change, and the arms 34 are caused to equally pivot as a result of pivoting the member 104.

Figure 13:
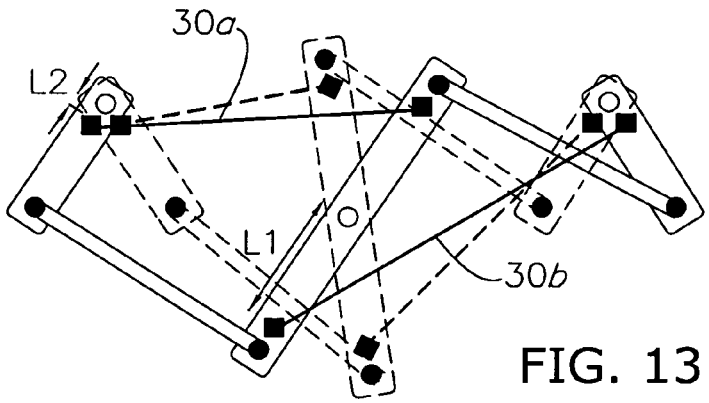
FIG. 13 is a partial schematic view of first and second deploy arms, and an actuator and assembly adapted for use with a preferred embodiment of the invention, including a driven member, first and second linking levers, and first and second SMA wires interconnecting the member and arms in a stowed condition, and in a deployed activated condition super-imposed in hidden line-type, wherein the wires are activated.

For example, at least one SMA wire 30 may be configured to linearly drive the member 104, as shown in FIG. 13. More particularly, the actuator 14 may include a first SMA wire 30a connected to the driven member 104 at a position spaced from the central point 104a a first distance, L1, and to the respective deploy arm 34 at a position spaced from the respective arm pivot point 38 a second distance L2 (FIG. 13). The ratio L1/L2 presents a predetermined ratio that considers the relationship between drive force and displacement. That is to say, where greater pivoting force is required L1/L2 can be reduced by either moving the connection point of the wire 30a and member 104 closer to the central point 104a or moving the connection point of the wire 30a and arm 34 away from the arm pivot point 38. More preferably, the actuator 14 further includes a second SMA wire 30b that interconnects the member 104 and other deploy arm 34 similar to the first wire 30a, so as to present a spatial ratio congruent to L1/L2. In this configuration, the first and second wires 30a,b are preferably contemporaneously activated so as to act in harmony and cooperatively produce a combined actuation force.

Alternatively, the second wire 30b may be replaced by an antagonistic element 90, such as a tension spring that resists the motion caused by the first wire 30a when activated (i.e., works to pivot the driven member 104 in the opposite direction). Here, the spring 90 presents a sufficient modulus to cause the assembly 16 to return to its stowed condition upon deactivation of the first wire 30a, but is not so great that the activation force of the wire 30a is not able to overcome.

In other embodiments employing a rotatable driven member 104, the actuator 14 is configured to directly impart a torque force thereupon. For example, and as shown in FIG. 14, the actuator 14 may include an SMA torque tube 108 that is coupled to the driven member 104. The member 104 is caused to pivot when the SMA material within the tube 108 is activated. More particularly, intermeshed first and second gears 110, 112 inter-connect the tube 108 and member 104 through first and second drive rods 114, 116. It is appreciated that a difference in operable radii of the gears 110, 112 enables step-up or down treatment of the generated torque force and resultant displacement.

A biasing element 118 operable to impart a torque force upon the member 104 is preferably provided antagonistic to the torque tube 108. The biasing element 118 may consist of a second torque tube or a torsion spring engaging the first rod 114 (FIG. 14). Thus, the driving first gear is fixedly connected to and caused to rotate by the tube actuator, and the driven second gear is fixedly coupled to the driven member. Also shown in FIG. 14 are distal drive rod bearings 120 for reducing friction loss experienced by the driven member 104.

Alternatively, the driven member 104 may be coupled to a spooled actuator 122 instead of the torque tube 108, as shown in FIG. 15. In this configuration, SMA wire 30a is spooled around a boss 124 coupled to the first drive rod 114 and fixedly connected to the vehicle 18. Similarly, the biasing element 118 in this regard could comprise a torque tube, torsional spring, or a second spooled actuator 126 consisting of a second wire 30b wound about a second boss 128 and configured to return the assembly 16 to its stowed condition, once the first actuator 122 is deactivated.

In a preferred embodiment shown in FIG. 16, the assembly 16 may include a worm gear drive mechanism 130 having a main shaft 132, left and right worm sectors 134,136, and a drive sector 138 driven by the output, for example, of the previously described torque tube or spooled actuators 108, 122. In this configuration, each arm 34 again defines a distal pivot point 38 and a shaft engaging gear 140 at the point. The gears 140 are inter-meshed with the left and right worm sectors 134,136 respectively, such that the arms 34 are caused to pivot oppositely and congruently between stowed and deployed conditions, as the shaft 132 rotates. Support rod bearings 141 are further provided to reduce friction loss.

Where the arms 34 define distal pivot points 38 and engaging gears 140, the driven member 104 may alternatively be a main sprocket gear (FIG. 17). In this configuration, first and second drive shafts 142 are intermediately coupled to the main sprocket gear 104 and deploy arms 34 by a chain 144. The chain 144 presents a crossed engagement with only one of the drive shafts 142, so as to reverse the rotation of that shaft 142 relative to the other. The shafts 142 include chain-entrained drive shaft sprockets 146 fixedly attached at one end, and arm-engaging gears 148 fixedly attached at the other. It is appreciated that step-up and down treatment is available in this configuration as well; for example, where the shaft sprockets 146 present a smaller diameter than does the main sprocket, as shown in FIG. 17, displacement is increased.

Alternatively, and as shown in FIG. 18, the driven member 104 may similarly present a main pulley 104 in lieu of the main sprocket gear. In this configuration, the chain 144 is replaced by a friction belt 150, and the drive shaft sprocket 146 by pulley members 152 fixedly attached at one end. Here, it is appreciated that proper tensioning in the belt must be maintained to ensure synchronization.

Figure 19:
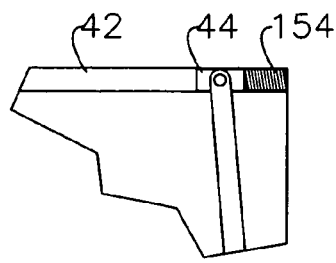
FIG. 19 is a partial elevation view of a deployment system further including a stowing assist compression spring engaging a first deploy arm and sliding slot in a compressed condition, according to a preferred embodiment of the invention.
Figure 19A:
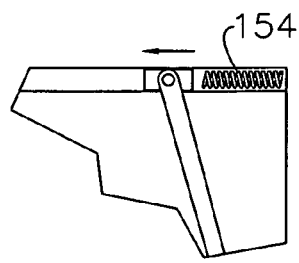
FIG. 19a is a partial elevation view of the system shown in FIG. 19, wherein the spring is in a decompressed condition.

Finally, it is appreciated that various other appurtenances may be added to the system 10 without diverting from the scope of the present invention; for example, lateral end springs 154 housed within the slot 42 may be used to provided stowing assistance. As shown in FIGS. 19 and 19a, the end springs 154 are caused to compress by the sliders 44 in the deployed condition, such that the sliders 44 and therefore arms 34 are biased towards the stowed condition.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

The preferred forms of the invention described above are to be used as illustration only, and should not be utilized in a limiting sense in interpreting the scope of the present invention. Obvious modifications to the exemplary embodiments and methods of operation, as set forth herein, could be readily made by those skilled in the art without departing from the spirit of the present invention. The inventors hereby state their intent to rely on the Doctrine of Equivalents to determine and assess the reasonably fair scope of the present invention as pertains to any system or method not materially departing from but outside the literal scope of the invention as set forth in the following claims.

What is claimed is:

1. A system for deploying a cover utilizing active material activation, said system comprising:

an assembly including at least one sliding slot securely coupled to the cover, first and second sliders securely coupled to and linearly translatable relative to said at least one slot, and first and second deploy arms pivotally connected to said first and second sliders respectively and defining first and second stationary arm pivot points, and reconfigurable between deployed and stowed conditions wherein the cover is respectively deployed and stowed; and an actuator including an active material element operable to undergo a change when activated, said actuator being drivenly coupled to the assembly and configured to impart a linear translation force upon the arms such that the arms are caused to pivot as a result of the change, and the cover and assembly are caused to switch between the deployed and stowed conditions as a result of pivoting the arms, wherein each deploy arm includes telescopingly engaged inner and outer arm sections and a cam concentrically aligned with the pivot point, each deploy arm is biased towards a fully extended condition, a cable interconnects the inner sections of each arm, and the cable and cams are cooperatively configured such that the cams engage the cable and the inner sections are caused to retract, as the arms pivot.

2. The system as claimed in claim 1, wherein the element presents first and second crossing shape memory alloy wires, each connected to one said first and second deploy arms and a fixed point.

3. The system as claimed in claim 1, further comprising:

first and second stowing assist springs housed within distal end sections of the slot, such that the springs are caused to be compressed by the sliders, when the arms are in the deployed condition.

* * * * *